US012476378B2

(12) United States Patent
Chou et al.

(10) Patent No.: US 12,476,378 B2
(45) Date of Patent: Nov. 18, 2025

(54) ANTENNA MODULE, ANTENNA SUPPORTING SUBSTRATE AND MANUFACTURING METHOD THEREOF

(71) Applicant: PHOENIX PIONEER TECHNOLOGY CO., LTD., Hsinchu County (TW)

(72) Inventors: Pao-Hung Chou, Hsinchu County (TW); Shih-Ping Hsu, Hsinchu County (TW)

(73) Assignee: PHOENIX PIONEER TECHNOLOGY CO., LTD., Hsinchu County (TW)

( * ) Notice: Subject to any disclaimer, the term of this patent is extended or adjusted under 35 U.S.C. 154(b) by 156 days.

(21) Appl. No.: 18/461,497

(22) Filed: Sep. 5, 2023

(65) Prior Publication Data

US 2024/0136728 A1 Apr. 25, 2024
US 2024/0235046 A9 Jul. 11, 2024

(30) Foreign Application Priority Data

Oct. 19, 2022 (TW) ................................. 111139689

(51) Int. Cl.
*H01Q 13/18* (2006.01)
*H01Q 1/22* (2006.01)

(52) U.S. Cl.
CPC ........... *H01Q 13/18* (2013.01); *H01Q 1/2283* (2013.01)

(58) Field of Classification Search
CPC ..... H01Q 1/2283; H01Q 13/18; H01Q 19/106
See application file for complete search history.

(56) References Cited

U.S. PATENT DOCUMENTS

| | | | | |
|---|---|---|---|---|
| 11,816,607 | B2 * | 11/2023 | Wang | G06F 3/0483 |
| 2016/0020165 | A1 * | 1/2016 | Kamgaing | H01L 21/486 257/532 |
| 2019/0114526 | A1 * | 4/2019 | Finn | H01Q 21/29 |
| 2021/0192311 | A1 * | 6/2021 | Lotya | G06K 19/07747 |
| 2022/0130595 | A1 * | 4/2022 | Okuzawa | H01F 27/292 |
| 2022/0296298 | A1 * | 9/2022 | Liu | A61B 18/1815 |
| 2023/0060817 | A1 * | 3/2023 | Nemouchi | H10N 60/12 |
| 2023/0326921 | A1 * | 10/2023 | Cha | H10D 62/812 257/25 |
| 2023/0364643 | A1 * | 11/2023 | Jumbe | H10N 30/308 |
| 2025/0091114 | A1 * | 3/2025 | David | B21D 41/04 |
| 2025/0097604 | A1 * | 3/2025 | Omodani | H04N 25/773 |

* cited by examiner

*Primary Examiner* — Thien M Le
(74) *Attorney, Agent, or Firm* — Studebaker Brackett PLLC

(57) ABSTRACT

An antenna module is provided, in which an antenna supporting substrate having a step-shaped hollow cavity is disposed on a circuit structure having an antenna part, so that the antenna part is exposed from the step-shaped hollow cavity, and an antenna structure is arranged on the steps of the step-shaped hollow cavity to cover the antenna part and is electromagnetically coupled with the antenna part, and there is no barrier but an air medium between the antenna structure and the antenna part.

11 Claims, 7 Drawing Sheets

ANTENNA MODULE, ANTENNA SUPPORTING SUBSTRATE AND MANUFACTURING METHOD THEREOF

BACKGROUND

1. Technical Field

The present disclosure relates to a semiconductor packaging process, in particular, to an antenna module, a supporting substrate and a manufacturing method thereof.

2. Description of Related Art

At present, wireless communication technology has been widely used in various consumer electronic products in order to receive or send various wireless signals. However, in order to meet the appearance design requirements of consumer electronics products, the manufacture and design of wireless communication modules are developed towards light, thin, short and small requirements, wherein the patch antenna is widely used in wireless communication modules of electronic products such as cell phones due to its small size, light weight and easy manufacture.

As shown in FIG. 1A, it is a schematic cross-sectional view of a conventional wireless communication module 1*a*. The wireless communication module 1*a* includes a circuit substrate 10, at least one semiconductor chip 11 disposed on the lower side of the circuit substrate 10, a plurality of solder balls 19 disposed on the lower side of the circuit substrate 10, an insulator 12 disposed on the upper side of the circuit substrate 10 and an antenna structure 13 bonded to the insulator 12, and the antenna structure 13 includes a first antenna layer 131 and a second antenna layer 132 which are separated from each other and correspondingly disposed on both sides of the insulator 12, wherein the first antenna layer 131 and the second antenna layer 132 are electromagnetically coupled to each other to transmit signals.

In the conventional wireless communication module 1*a*, the Antenna in Package (AiP) technology is applied to the substrate structure. Therefore, the material of the antenna needs to be a high-frequency material, and most preferably the dielectric constant is Dk<3 and the dissipation factor is Df<0.002, wherein the air is the best material.

However, even if the insulator 12 is made with a low dielectric constant material as the medium of the antenna structure 13, there is still signal loss at high frequencies, and materials with low dielectric constant, such as liquid crystal polymer (LCP), Rogers and other high-frequency materials, are expensive.

Therefore, air is adopted as the antenna medium in the industry, as shown in FIG. 1B, which is a schematic cross-sectional view of a conventional wireless communication module 1*b*. In the wireless communication module 1*b*, an antenna substrate 13*a* is stacked on the upper side of the circuit substrate 10 via a plurality of solder balls 18, wherein a semiconductor chip 11 is disposed on the lower side of the circuit substrate 10, and the plurality of solder balls 19 are formed under the circuit substrate 10, wherein an air medium A is formed between the circuit substrate 10 and the antenna substrate 13*a* for signal transmission between the antenna substrate 13*a* and the circuit substrate 10.

However, in the conventional wireless communication module 1*b*, two substrates are stacked to each other to form an AiP, and the height of the air medium A depends on a height H of the solder ball 18. Therefore, the tolerance of the volume and height of the solder balls 18 after reflow is large, so that the solder balls 18 are prone to poor co-planarity, resulting in that the antenna substrate 13*a* is connected to the circuit substrate 10 at an inclination, which causes a large error in the antenna position of the antenna substrate 13*a*, thereby affecting the performance of the antenna.

Moreover, the antenna substrate 13*a* and the air medium A are used as an antenna in package (AiP), so only one layer of antenna can be arranged in the dielectric layer of the antenna substrate 13*a*.

Therefore, how to overcome the above-mentioned drawbacks of the prior art has become an urgent issue to be solved at present in the industry.

SUMMARY

In view of the aforementioned shortcomings of the prior art, the present disclosure provides an antenna supporting substrate, comprising: an insulator having a first surface and a second surface opposing the first surface; and a step-shaped hollow cavity connecting the first surface and the second surface and presenting a plurality of steps, wherein the step-shaped hollow cavity has a plurality of openings, and widths of the plurality of openings increase gradually and sequentially from the first surface to the second surface to form the plurality of steps.

In the aforementioned antenna supporting substrate, the insulator further has an electrical conduction circuit.

In the aforementioned antenna supporting substrate, a material of the insulator is a photosensitive or non-photosensitive insulating material, including an Ajinomoto build-up film, an epoxy resin of a prepreg, an epoxy resin molding compound, or other dielectric materials.

The present disclosure further provides an antenna module, comprising: a circuit structure having a first side and a second side opposing the first side, and at least one antenna part formed on the second side; the aforementioned antenna supporting substrate bonded onto the second side of the circuit structure via the first surface, wherein the antenna part is exposed from the step-shaped hollow cavity; and at least one antenna structure comprising an antenna substrate made of an insulating material and an antenna layer bonded to the antenna substrate, wherein the antenna substrate of the antenna structure is straddled on one of the steps of the step-shaped hollow cavity of the antenna supporting substrate, and the antenna layer of the antenna structure is stacked above corresponding to the antenna part of the circuit structure, so that the antenna layer and the antenna part are electromagnetically coupled to each other, and between the antenna structure and the antenna part is a hollow space with an air medium.

In the aforementioned antenna module, the antenna supporting substrate further has an electrical conduction circuit for electrically connecting the circuit structure and/or the antenna structure.

In the aforementioned antenna module, a plurality of the antenna parts are provided on the second side of the circuit structure, a plurality of the corresponding antenna structures are straddled on a plurality of layers of the steps in the antenna supporting substrate respectively, and a number of layers of the plurality of antenna structures corresponds to the plurality of antenna parts, wherein all the antenna structures between the antenna layer of the antenna substrate of any one of the antenna structures and the antenna part of the circuit structure have an opening corresponding to the antenna part, so that there is no barrier but an air medium between the antenna layer of the antenna substrate of any one of the antenna structures and the corresponding antenna part.

In the aforementioned antenna module, the insulating material constituting the antenna substrate is a rigid and warp-resistant glass material, an epoxy resin molding compound material, an Ajinomoto build-up film, a rigid engineering plastic with low dielectric coefficient, or a combination thereof.

The present disclosure further provides a method of manufacturing an antenna supporting substrate, comprising: providing a detachable carrier board with a metal surface; forming a photoresist layer with a hollow cavity on the carrier board by patterned exposure and development, and forming a metal layer by electroplating in the hollow cavity of the photoresist layer; repeating processes of the photoresist layer and the metal layer multiple times to form a plurality of other photoresist layers and a plurality of other metal layers stacked on the photoresist layer and the metal layer, wherein a width of each of the stacked metal layers decreases gradually from bottom to top in a stepped shape; removing all the photoresist layers to expose the plurality of metal layers stacked in the stepped shape; forming an insulating layer made of an insulating material on the carrier board to cover the plurality of metal layers stacked in the stepped shape, and removing part of the insulating material to expose an upper surface of the uppermost metal layer; removing the carrier board to expose a lower surface of the lowermost metal layer; and removing all of the plurality of metal layers, so that the insulating layer is formed into the antenna supporting substrate having a step-shaped hollow cavity presenting a plurality of steps.

In the aforementioned method, the present disclosure further comprises simultaneously forming a patterned concave hole around the hollow cavity when the hollow cavity of the photoresist layer of each layer is formed, and simultaneously forming an electrical conduction circuit in the concave hole when each of the metal layers is formed.

The present disclosure further provides a method of manufacturing an antenna supporting substrate, comprising: providing a detachable carrier board; forming a photoresist layer on the carrier board by patterned exposure and development; repeating processes of the photoresist layer multiple times to form a plurality of other photoresist layers stacked on the photoresist layer, wherein a width of each of the stacked photoresist layers decreases gradually from bottom to top in a stepped shape; forming an insulating layer made of an insulating material on the carrier board to cover all the photoresist layers, and removing part of the insulating material to expose an upper surface of the uppermost photoresist layer; removing the carrier board to expose a lower surface of the lowermost photoresist layer; and removing all of the photoresist layers, so that the insulating layer is formed into the antenna supporting substrate having a step-shaped hollow cavity presenting a plurality of steps.

In the aforementioned method, the present disclosure further comprises forming a patterned electrical conduction circuit around any one of the photoresist layers after forming said any one of the photoresist layers.

The present disclosure further provides a method of manufacturing an antenna supporting substrate, comprising: providing a detachable carrier board; forming a photosensitive insulating layer made of a photosensitive insulating material on the carrier board, and forming an opening area for defining a hollow cavity by patterning in an exposure manner; repeating processes of the photosensitive insulating layer and the opening area multiple times to form a plurality of other stacked photosensitive insulating layers and define a corresponding plurality of opening areas, wherein a width of each of the stacked opening areas decreases gradually from bottom to top in a stepped shape; removing the carrier board to expose a lower surface of the lowermost photosensitive insulating layer; and removing the photosensitive insulating material in each of the opening areas, so that the plurality of stacked photosensitive insulating layers are formed into the antenna supporting substrate having a step-shaped hollow cavity presenting a plurality of steps.

In the aforementioned method, the present disclosure further comprises simultaneously defining a patterned concave hole around the opening area when the opening area of the hollow cavity of each of the photosensitive insulating layers is defined, and forming an electrical conduction circuit in the concave hole.

As can be seen from the above, in the antenna module, the antenna supporting substrate and the manufacturing method thereof of the present disclosure, the antenna structure is stacked by an antenna supporting substrate having a step-shaped hollow cavity to form a package antenna with an air medium. Therefore, compared with the prior art, the number of steps of the antenna supporting substrate can be designed according to the requirement of the number of antenna substrates of the antenna structure, so that the antenna structure can be equipped with multi-layer antennas for multi-frequency applications.

Furthermore, the height of the air medium depends on the height of the step, so that the tolerance of the volume and height of the antenna supporting substrate after thermal processing remains unchanged. Therefore, the steps still maintain good coplanarity, so that the antenna substrate and the circuit structure can maintain a horizontal connection, so as to avoid errors in the position of the antenna layer, thereby avoiding the problem of lowering the antenna performance.

DETAILED DESCRIPTION

Figure 1A:
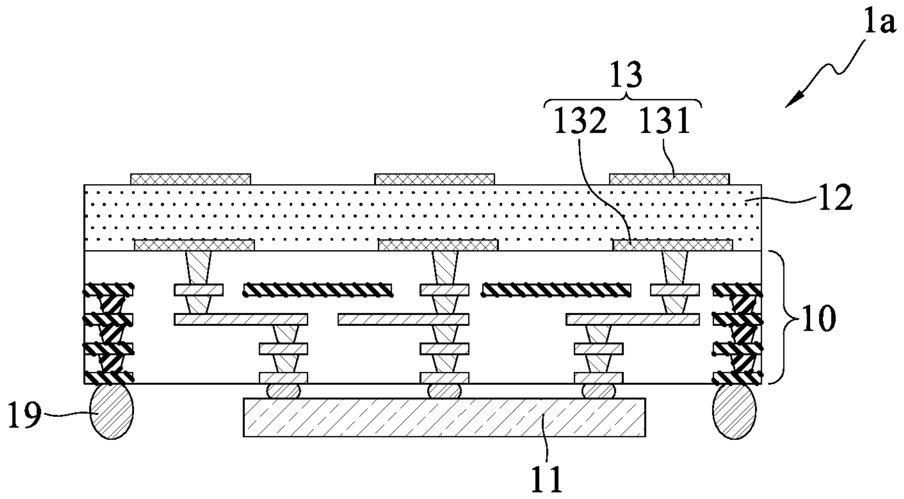
FIG. 1A (PRIOR ART)
FIG. 1A is a schematic cross-sectional view of a conventional wireless communication module.
Figure 1B:
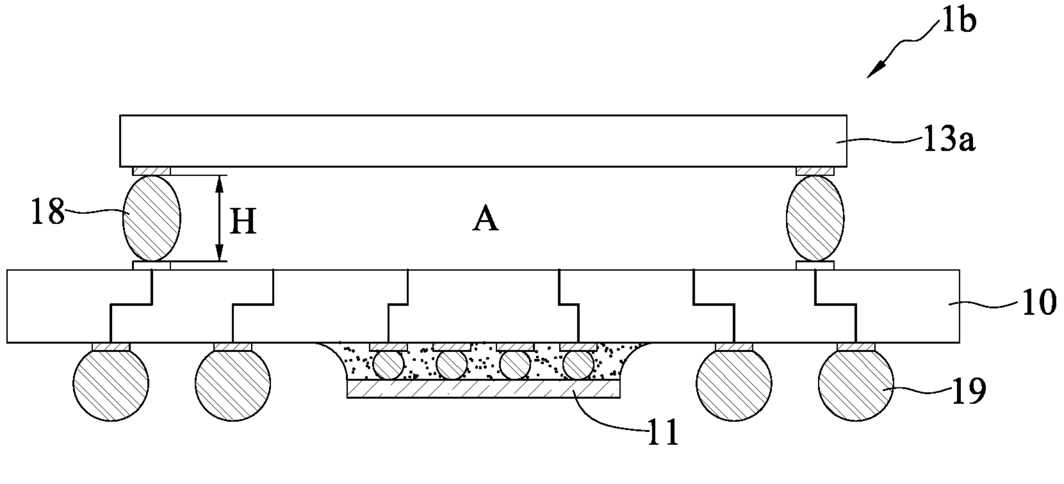
FIG. 1B (PRIOR ART)
FIG. 1B is a schematic cross-sectional view of a conventional wireless communication module.

Implementations of the present disclosure are described below by embodiments. Other advantages and technical effects of the present disclosure can be readily understood by one of ordinary skill in the art upon reading the disclosure of this specification.

It should be noted that the structures, ratios, sizes shown in the drawings appended to this specification are provided in conjunction with the disclosure of this specification in order to facilitate understanding by those skilled in the art.

They are not meant, in any ways, to limit the implementations of the present disclosure, and therefore have no substantial technical meaning. Without influencing the effects created and objectives achieved by the present disclosure, any modifications, changes or adjustments to the structures, ratios or sizes are construed as fall within the scope covered by the technical contents disclosed herein. Meanwhile, terms such as “above,” “on,” “first,” “second,” “one,” “a,” “an,” and the like, are for illustrative purposes, and are not meant to limit the scope implementable by the present disclosure. Any changes or adjustments made to the relative relationships, without substantially modifying the technical contents, are also to be construed as within the scope implementable by the present disclosure.

Figure 2:
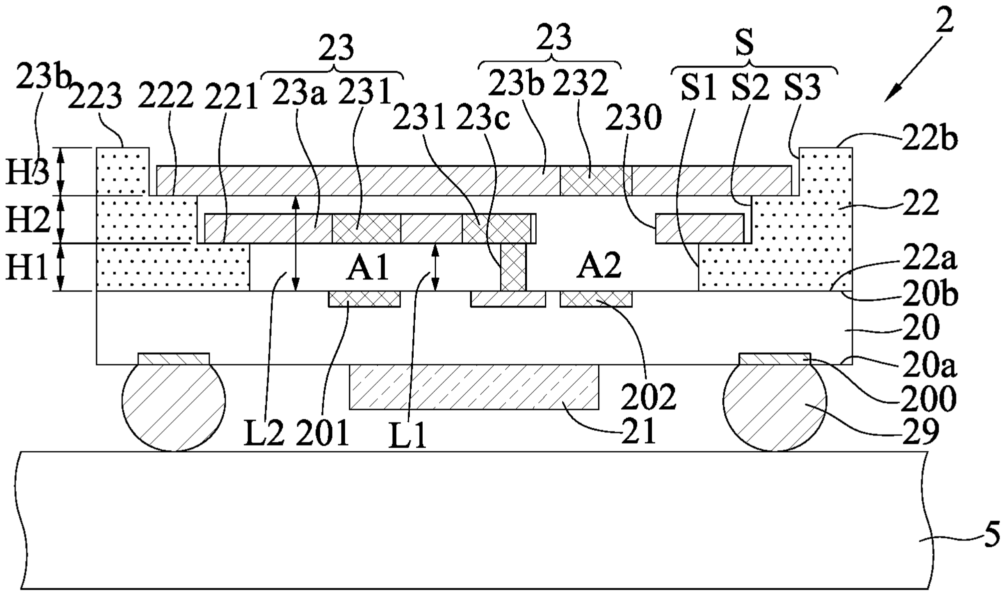
FIG. 2 is a schematic cross-sectional view of an antenna module according to the present disclosure.

FIG. 2 is a schematic cross-sectional view of an antenna module 2 according to the present disclosure. The antenna module 2 comprises: a circuit structure 20, at least one electronic element 21, an antenna supporting substrate 22, at least one antenna structure 23, and a plurality of solder balls 29.

The circuit structure 20 has a first side 20*a* and a second side 20*b* opposing the first side 20*a*, and the circuit structure 20 is for example a package substrate with a core layer or a carrier board without a core layer (coreless).

In an embodiment, the circuit structure 20 comprises a dielectric material and at least one circuit layer formed on the dielectric material, such as at least one fan-out type redistribution layer (RDL). For example, the circuit layer on the first side 20*a* of the circuit structure 20 has a plurality of external pads 200, which are exposed from the first side 20*a* of the circuit structure 20 to serve as signal ports (I/O) or ground ports (I/O), and the circuit layer on the second side 20*b* of the circuit structure 20 has at least one first antenna part 201 and at least one second antenna part 202.

The electronic element 21 is disposed on the first side 20*a* of the circuit structure 20 and/or embedded on the second side 20*b* and electrically connected to the first antenna part 201 and the second antenna part 202 of the circuit structure 20 in a flip-chip packaging manner.

In an embodiment, the electronic element 21 is an active element, a passive element, or a module of a combination of the active element and the passive element, and the like, wherein the active element is for example a semiconductor chip, and the passive element is for example a resistor, a capacitor, or an inductor. For example, the electronic element 21 is a semiconductor chip with millimeter wave (mmWave) function and is electrically connected to the first antenna part 201 and the second antenna part 202. It should be understood that there is no particular limitation on the manner in which the electronic element 21 is electrically connected to the circuit structure 20.

The antenna supporting substrate 22 is an insulator, which has a first surface 22*a* and a second surface 22*b* opposite to each other and a step-shaped hollow cavity S showing multiple layers of steps connecting the first surface 22*a* and the second surface 22*b*, and the antenna supporting substrate 22 is bonded onto the second side 20*b* of the circuit structure 20 with the first surface 22*a* thereof, so that the first antenna part 201 and the second antenna part 202 are exposed from the step-shaped hollow cavity S.

In an embodiment, the step-shaped hollow cavity S has a plurality of openings S1, S2, S3 with different widths in sequence from the first surface 22*a* toward the second surface 22*b*, and the widths of the plurality of openings S1, S2, S3 increase gradually and sequentially from the first surface 22*a* toward the second surface 22*b* to form a plurality of steps for supporting the antenna structure 23, such as a first step 221, a second step 222 and a third step 223 shown in the figure.

Furthermore, heights H1, H2, H3 of at least two of each step (such as the first step 221, the second step 222 and the third step 223) of the step-shaped hollow cavity S of the antenna supporting substrate 22 are the same or different.

Also, the material for forming the antenna supporting substrate 22 (or the insulator) can be a photosensitive insulating material or a non-photosensitive insulating material, for example, Ajinomoto build-up film (ABF), epoxy resin of prepreg (PP), epoxy molding compound (EMC), or other dielectric materials, but not limited to the above.

The antenna structure 23 includes an antenna substrate (such as a first antenna substrate 23*a* or a second antenna substrate 23*b*) made of insulating material and an antenna layer (such as a first antenna layer 231 or a second antenna layer 232) bonded to the antenna substrate, wherein the antenna substrate of the antenna structure 23 is straddled on one of the steps (such as the first step 221 and the second step 222) of the step-shaped hollow cavity S of the antenna supporting substrate 22, so as to cover the first antenna part 201 and/or the second antenna part 202, and the antenna layer of the antenna structure 23 is stacked above corresponding to the first antenna part 201 and/or the second antenna part 202 of the circuit structure 20, so that the antenna layer and the first antenna part 201 and/or the second antenna part 202 are electromagnetically coupled to each other, and between the antenna structure 23 and the first antenna part 201 and the second antenna part 202 are hollow spaces with air mediums A1, A2, and distances L1, L2 between the antenna structure 23 and the second side 20*b* of the circuit structure 20 are kept constant.

In an embodiment, the first antenna substrate 23*a* of the antenna structure 23 straddles on the first step 221, and the second antenna substrate 23*b* straddles on the second step 222 to be stacked above the first antenna substrate 23*a*, wherein the first antenna substrate 23*a* has the first antenna layer 231, and the second antenna substrate 23*b* has the second antenna layer 232 stacked above corresponding to the second antenna part 202, so that the first antenna layer 231 is stacked above corresponding to the first antenna part 201 of the circuit structure 20, such that the first antenna layer 231 and the first antenna part 201 are electromagnetically coupled to each other.

Furthermore, the second antenna layer 232 and the second antenna part 202 are electromagnetically coupled to each other, so that the antenna signal can be transmitted between the second antenna layer 232 and the second antenna part 202 via the air medium A2. For example, the first antenna substrate 23*a* has at least one opening 230 corresponding to the second antenna layer 232, so that the second antenna layer 232 and the second antenna part 202 maintain an open space and communicate with each other to be filled with the air medium A2.

Also, the first antenna substrate 23*a* and the second antenna substrate 23*b* are inlaid with conductive metal (such as copper, silver, gold, or a combination thereof) in an insulating material with a low dielectric constant, wherein the insulating material constituting the antenna substrate can be glass material with rigidity and anti-warping, epoxy resin molding compound (EMC), Ajinomoto build-up film (ABF), rigid engineering plastic with low dielectric coefficient, or a combination thereof.

In addition, the first antenna substrate 23*a* can be supported on the second side 20*b* of the circuit structure 20 by one or a plurality of conductive pillars 23*c*. Furthermore, the conductive pillar 23*c* can also be electrically connected to the circuit layer of the second side 20*b* of the circuit structure 20 or the first antenna part 201 and the first antenna layer 231 for signal transmission or grounding.

The solder balls 29 are bonded onto the first side 20*a* of the circuit structure 20 and electrically connected to the circuit structure 20.

In an embodiment, the solder balls 29 are for example solder balls, which are disposed on the external pads 200 of the first side 20*a* of the circuit structure 20, so that the circuit structure 20 is bonded to and electrically connected to a circuit board 5 via the plurality of solder balls 29.

In other embodiments, the antenna supporting substrate 22 (the insulator) further has an electrical conduction circuit (not shown) to electrically connect the circuit structure 20 and/or the antenna structure 23.

Therefore, in the antenna module 2 of the present disclosure, the step-shaped antenna supporting substrate 22 is utilized to stack at least one layer of the antenna structure 23 to form an antenna in package (AiP) with the air mediums A1, A2. Therefore, compared with the prior art, the number of steps of the antenna supporting substrate 22 can be designed according to the requirement of the number of the antenna structures 23 to arrange the antenna structures 23 in multiple layers.

In addition, the step-shaped antenna supporting substrate 22 is mainly used as the support of the antenna substrate, and utilizes the characteristics that the heights H1, H2, H3 of each step are highly adjustable in production, so as to easily meet various antenna performance requirements. Therefore, even if only one antenna layer can be arranged in the dielectric layer of the first antenna substrate 23*a* and the second antenna substrate 23*b*, multiple antenna substrates can still be erected by the step-shaped antenna supporting substrate 22, so that the antenna structure 23 effectuates an antenna applicable to multiple frequencies, so as to facilitate the single antenna module 2 to meet the requirements of multiple radio-frequency products.

FIG. 3A to FIG. 3D are schematic cross-sectional views illustrating a first embodiment of a manufacturing method of the antenna supporting substrate 22 according to the present disclosure.

Figure 3A:
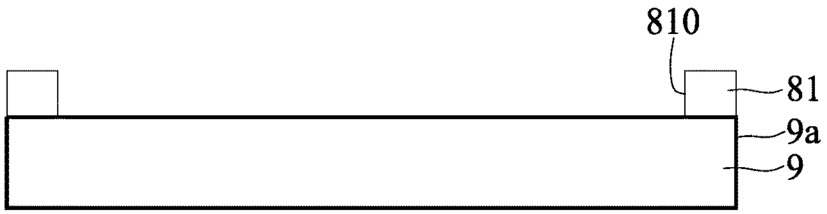
FIG. 3A to FIG. 3F are schematic cross-sectional views illustrating a first embodiment of a manufacturing method of a supporting substrate according to the present disclosure.
Figure 3B:
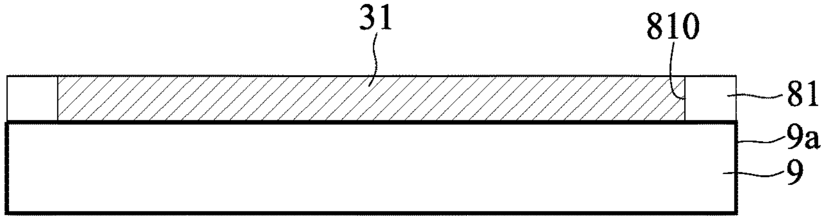

As shown in FIG. 3A to FIG. 3B, a detachable carrier board 9 with a metal surface 9*a* is provided, and a first photoresist layer 81 having a first hollow cavity 810 is formed on the carrier board 9 by patterned exposure and development, then a first metal layer 31 is formed in the first hollow cavity 810 by electroplating copper.

In an embodiment, the carrier board 9 is such as a core layer copper foil substrate or a metal sheet substrate, but there is no particular limitation.

Figure 3C:
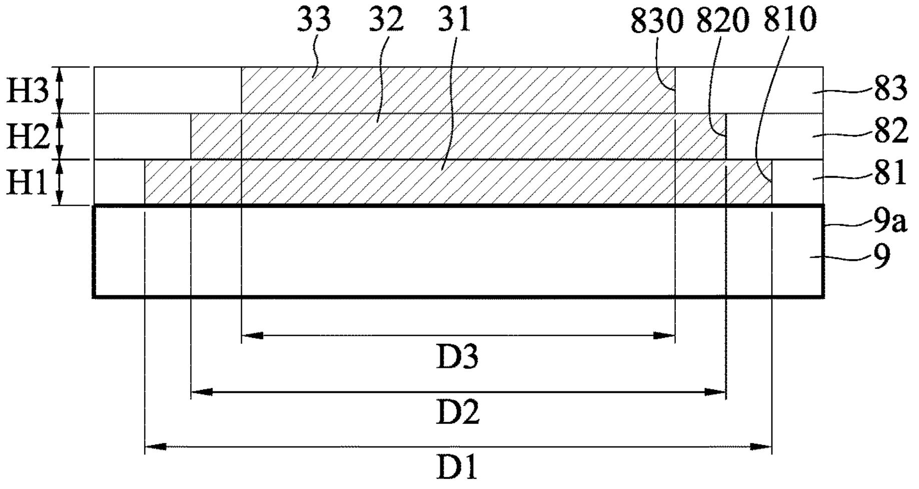

As shown in FIG. 3C, on the first photoresist layer 81 and the first metal layer 31, the above-mentioned same process is adopted, and the processes of the photoresist layer and the metal layer are repeated several times to form a plurality of other photoresist layers and a plurality of other metal layers stacked on the first photoresist layer 81 and the first metal layer 31, that is, a second photoresist layer 82 stacked on the first photoresist layer 81 and the first metal layer 31 is formed by patterned exposure and development, and a second metal layer 32 is embedded in a second hollow cavity 820 of the second photoresist layer 82, then a third photoresist layer 83 stacked on the second photoresist layer 82 and the second metal layer 32 is formed by patterned exposure and development, and a third metal layer 33 is embedded in a third hollow cavity 830 of the third photoresist layer 83, so as to form the second and third photoresist layers 82, 83 and the second and third metal layers 32, 33 stacked on the first photoresist layer 81 and the first metal layer 31.

In an embodiment, the width of each of the stacked metal layers gradually decreases from bottom to top in a stepped shape. For example, the first metal layer 31, the second metal layer 32 and the third metal layer 33 are stacked correspondingly, and the widths of the first hollow cavity 810 of the first photoresist layer 81, the second hollow cavity 820 of the second photoresist layer 82, and the third hollow cavity 830 of the third photoresist layer 83 decrease gradually and sequentially from bottom to top, so that the widths of the first metal layer 31, the second metal layer 32 and the third metal layer 33 also decrease gradually and sequentially from bottom to top. In other words, a width D1 of the first metal layer 31 is greater than a width D2 of the second metal layer 32, and the width D2 of the second metal layer 32 is greater than a width D3 of the third metal layer 33.

Figure 3D:
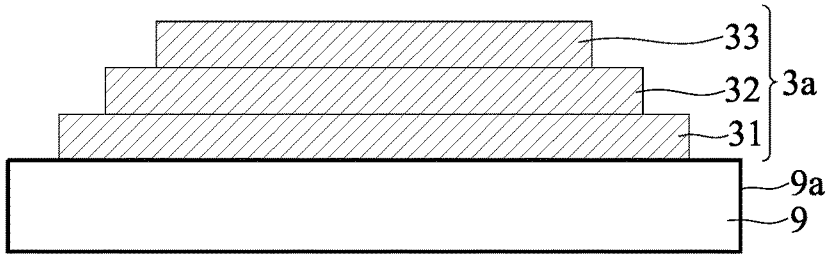

As shown in FIG. 3D, the first photoresist layer 81, the second photoresist layer 82 and the third photoresist layer 83 are removed to expose the first metal layer 31, the second metal layer 32 and the third metal layer 33 stacked in a stepped stack 3*a*, wherein the stepped stack 3*a* comprises at least three metal layers.

Figure 3E:
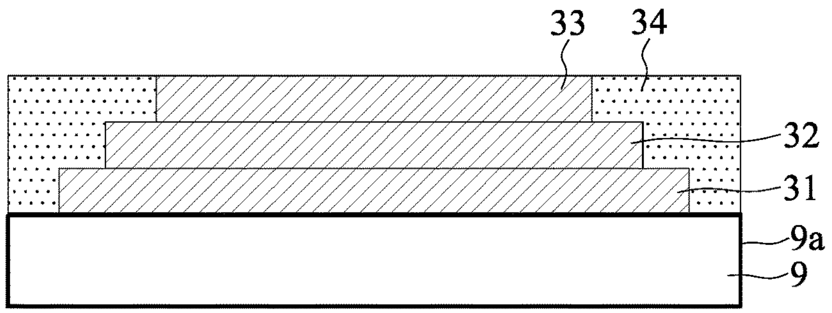

As shown in FIG. 3E, an insulating layer 34 made of an insulating material is formed on the carrier board 9 to cover the first metal layer 31, the second metal layer 32 and the third metal layer 33 stacked in a stepped shape. Then, a leveling operation is performed to remove part of the insulating material of the insulating layer 34 by grinding or physical etching (such as plasma), so as to expose the upper surface of the uppermost third metal layer 33.

In an embodiment, the insulating material is formed on the carrier board 9 by molding, coating, or pressing, and the material for forming the insulating material is a photosensitive or non-photosensitive dielectric material, for example, Ajinomoto build-up film (ABF), epoxy resin of prepreg (PP), epoxy resin molding compound (EMC), or other dielectric materials, but not limited to the above.

Figure 3F:
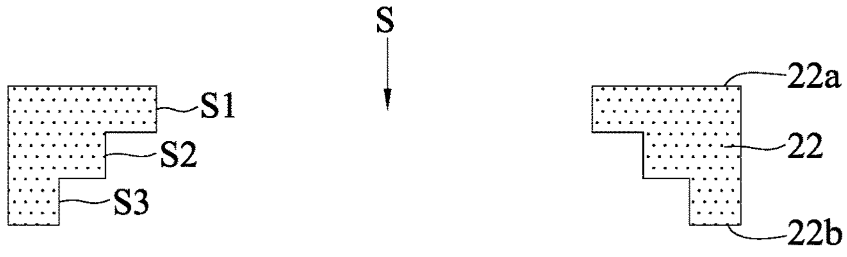

As shown in FIG. 3F, the carrier board 9 is removed to expose the lower surface of the lowermost first metal layer 31, and then all of the first metal layer 31, the second metal layer 32 and the third metal layer 33 are removed by etching, so that the insulating layer 34 is formed as the antenna supporting substrate 22 having the step-shaped hollow cavity S presenting a plurality of steps.

In subsequent applications, the antenna structure 23 can be carried by simply turning the antenna supporting substrate 22 shown in FIG. 3F over.

Therefore, the antenna supporting substrate 22 is made into the step-shaped hollow cavity S by patterned exposure and development, copper electroplating and mold sealing, etc., so as to obtain better dimensions (such as the heights H1, H2, H3 of the steps), and can save the mold cost. For example, if the mold opening method is used, a single mold can only produce a step-shaped hollow structure with fixed step specifications. When it is desired to change the height or number of steps, another set of molds needs to be made, resulting in a significant increase in cost. In other words, the antenna supporting substrate 22 is made by utilizing patterned exposure and development, copper electroplating and mold sealing, etc., and only the specification of the photoresist layer needs to be adjusted when it is desired to change the height or number of steps, thereby greatly saving the manufacturing cost.

Furthermore, by utilizing the easy-to-change characteristics of the antenna supporting substrate 22 having the step-shaped hollow cavity S, the antenna design can be more diversified. For example, when manufacturing the antenna supporting substrate 22, according to the requirements of the antenna structure 23, the distances L1 and L2 between each of the antenna layers and each of the antenna parts (or the height position relative to the circuit structure 20) can be easily adjusted via the design of the steps.

Also, when the hollow cavity (the first hollow cavity 810, the second hollow cavity 820 and the third hollow cavity 830) of the photoresist layer of each layer is formed, a patterned concave hole is formed around the hollow cavity simultaneously, and when each of the metal layers (the first metal layer 31, the second metal layer 32 and the third metal layer 33) is formed, an electrical conduction circuit (not shown) is formed in the patterned concave hole simultaneously.

FIG. 4A to FIG. 4D are schematic cross-sectional views illustrating a second embodiment of the manufacturing method of the antenna supporting substrate 22 according to the present disclosure. The difference between this embodiment and the above-mentioned embodiments is that the fabrication of the metal layer is omitted, so the similarities will not be repeated below.

Figure 4A:
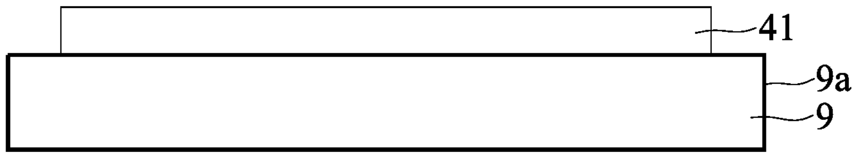
FIG. 4A to FIG. 4E are schematic cross-sectional views illustrating a second embodiment of the manufacturing method of the supporting substrate according to the present disclosure.
Figure 4B:
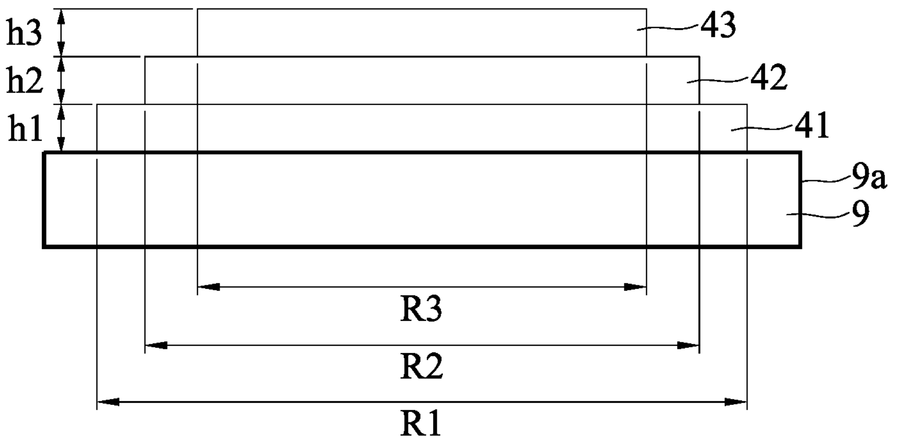

As shown in FIG. 4A to FIG. 4B, a first photoresist layer 41 is formed on the carrier board 9 by patterned exposure and development, and then the process of the photoresist layer is repeated several times to form a plurality of other photoresist layers stacked on the first photoresist layer 41, that is, a second photoresist layer 42 stacked on the first photoresist layer 41 is formed by patterned exposure and development, and a third photoresist layer 43 stacked on the second photoresist layer 42 is formed by patterned exposure and development, so as to form the second and third photoresist layers 42, 43 stacked on the first photoresist layer 41, wherein the stacked first photoresist layer 41, the second photoresist layer 42 and the third photoresist layer 43 have widths R1, R2, R3 decreasing gradually and sequentially from bottom to top in a stepped shape.

In an embodiment, the first photoresist layer 41, the second photoresist layer 42 and the third photoresist layer 43 are stacked correspondingly, and the width R1 of the first photoresist layer 41 is greater than the width R2 of the second photoresist layer 42, and the width R2 of the second photoresist layer 42 is greater than the width R3 of the third photoresist layer 43, so that the first photoresist layer 41, the second photoresist layer 42 and the third photoresist layer 43 are stacked in a stepped stack 4*a*, wherein the stepped stack 4*a* comprises at least three photoresist layers.

Furthermore, heights h1, h2, h3 of at least two of the first photoresist layer 41, the second photoresist layer 42 and the third photoresist layer 43 are the same or different.

Figure 4C:
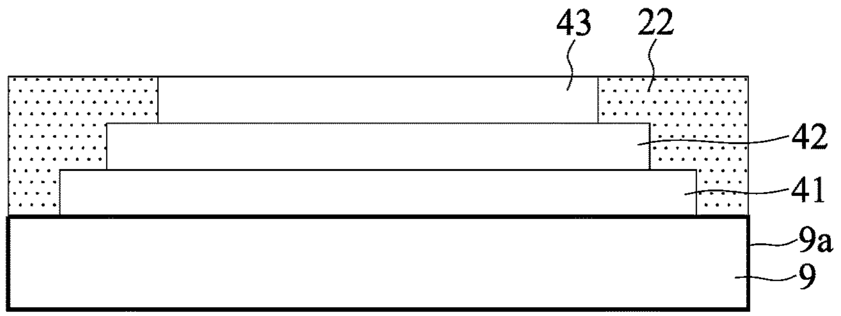

As shown in FIG. 4C, an insulating layer 44 made of an insulating material is formed on the carrier board 9 to cover all of the first photoresist layer 41, the second photoresist layer 42 and the third photoresist layer 43, and the insulating layer 44 covers at least three photoresist layers. Then, a leveling operation is performed to remove part of the insulating material of the insulating layer 44 by grinding to expose the upper surface of the uppermost third photoresist layer 43.

Figure 4D:
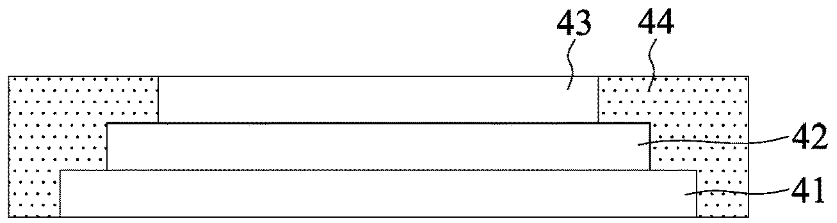

As shown in FIG. 4D, the carrier board 9 is removed to expose the lower surface of the lowermost first photoresist layer 41.

Figure 4E:
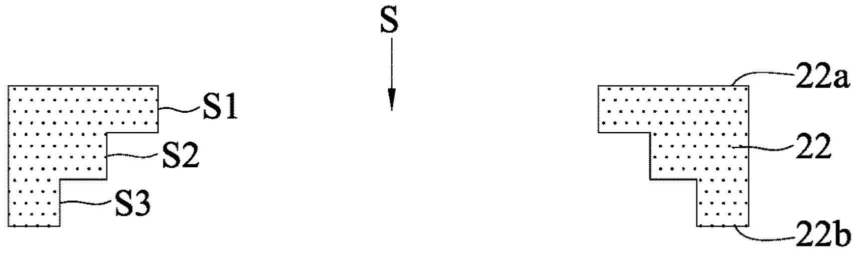

As shown in FIG. 4E, all of the first photoresist layer 41, the second photoresist layer 42 and the third photoresist layer 43 are removed, so that the insulating layer 44 is formed as the antenna supporting substrate 22 having the step-shaped hollow cavity S presenting a plurality of steps.

In subsequent applications, the antenna structure 23 can be carried by simply turning the antenna supporting substrate 22 shown in FIG. 4E over.

Therefore, the antenna supporting substrate 22 is made into the step-shaped hollow cavity S by patterned exposure and development and mold sealing, so as to obtain better dimensions (such as the heights H1, H2 of the steps).

Furthermore, by utilizing the easy-to-change characteristics of the antenna supporting substrate 22 having the step-shaped hollow cavity S, the antenna design can be more diversified. For example, when manufacturing the antenna supporting substrate 22, according to the requirements of the antenna structure 23, the distances L1 and L2 between each of the antenna layers and each of the antenna parts (or the height position relative to the circuit structure 20) can be easily adjusted via the design of the steps.

Also, before stacking and forming another photoresist layer on one of the photoresist layers, a patterned electrical conduction circuit (not shown) is formed around one of the photoresist layers.

FIG. 5A to FIG. 5D are schematic cross-sectional views illustrating a third embodiment of the manufacturing method of the antenna supporting substrate 22 of the present disclosure.

Figure 5A:
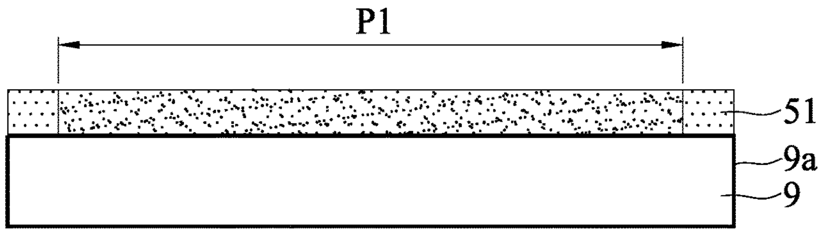
FIG. 5A to FIG. 5D are schematic cross-sectional views illustrating a third embodiment of the manufacturing method of the supporting substrate according to the present disclosure.

As shown in FIG. 5A, the detachable carrier board 9 is provided, and a first photosensitive insulating layer 51 made of a photosensitive insulating material is formed on the carrier board 9, and then a first opening area P1 for defining a hollow cavity is formed by patterning in an exposure manner.

Figure 5B:
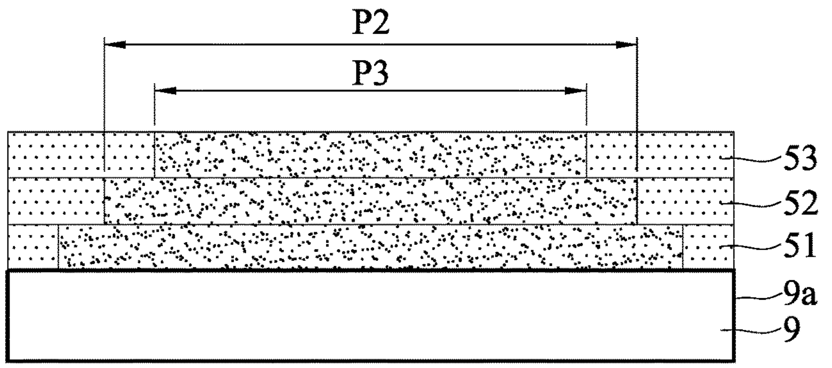

As shown in FIG. 5B, the processes of the photosensitive insulating layer and the opening area are repeated multiple times to form a plurality of other stacked photosensitive insulating layers and define a corresponding plurality of opening areas, that is, a second photosensitive insulating layer 52 is formed on the first photosensitive insulating layer 51, and then a second opening area P2 of a hollow cavity is patterned and defined by exposure; next, a third photosensitive insulating layer 53 is formed on the second photosensitive insulating layer 52, and then a third opening area P3 of a hollow cavity is patterned and defined by exposure, so as to form the second and third photosensitive insulating layers 52, 53 stacked on the first photosensitive insulating layer 51 and define the second and third opening areas P2, P3, wherein the widths of the stacked first to third opening areas P1, P2, P3 gradually decrease from bottom to top in a stepped shape.

Figure 5C:
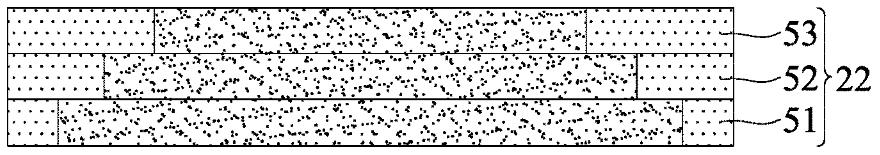

As shown in FIG. 5C, the carrier board 9 is removed to expose the lower surface of the lowermost first photosensitive insulating layer 51.

Figure 5D:
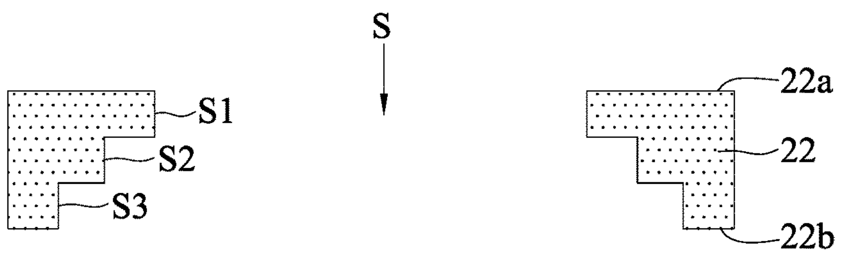

As shown in FIG. 5D, the photosensitive insulating material in the first to third opening areas P1, P2, P3 is removed by developing or etching, so that the stacked first to third photosensitive insulating layers 51, 52, 53 are formed into the antenna supporting substrate 22 having the step-shaped hollow cavity S presenting a plurality of steps, and the antenna supporting substrate 22 comprises at least three photosensitive insulating layers. It should be understood that, in another embodiment, the carrier board 9 can also be removed after removing the photosensitive insulating material in the first to third opening areas P1, P2, P3 by developing or etching.

In addition, when defining the opening area of the hollow cavity of each photosensitive insulating layer, a patterned concave hole can be defined around the opening area simultaneously, and an electrical conduction circuit is formed in the concave hole (not shown).

To sum up, in the antenna module 2, the antenna supporting substrate 22 and the manufacturing method thereof according to the present disclosure, the antenna supporting substrate 22 is designed to have the step-shaped hollow cavity S, so that the height of the antenna can be adjusted at any time according to the requirement without increasing the production cost. Therefore, the antenna supporting substrate 22 can maintain the horizontal connection between the antenna substrates (antenna structures 23) and the circuit structure 20, so as to avoid the position error of the antenna layer, thereby avoiding the problem of lowering the antenna performance.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. An antenna supporting substrate, comprising:

an insulator having a first surface and a second surface opposing the first surface; and a step-shaped hollow cavity connecting the first surface and the second surface and presenting a plurality of steps, wherein the step-shaped hollow cavity has a plurality of openings, and widths of the plurality of openings increase gradually and sequentially from the first surface to the second surface to form the plurality of steps.

2. The antenna supporting substrate of claim 1, wherein the insulator further has an electrical conduction circuit.

3. An antenna module, comprising:

a circuit structure having a first side and a second side opposing the first side, and at least one antenna part formed on the second side;

the antenna supporting substrate of claim 1 bonded onto the second side of the circuit structure via the first surface, wherein the antenna part is exposed from the step-shaped hollow cavity; and at least one antenna structure comprising an antenna substrate made of an insulating material and an antenna layer bonded to the antenna substrate, wherein the antenna substrate of the antenna structure is straddled on one of the steps of the step-shaped hollow cavity of the antenna supporting substrate, and the antenna layer of the antenna structure is stacked above corresponding to the antenna part of the circuit structure, so that the antenna layer and the antenna part are electromagnetically coupled to each other, and between the antenna structure and the antenna part is a hollow space with an air medium.

4. The antenna module of claim 3, wherein the antenna supporting substrate further has an electrical conduction circuit for electrically connecting the circuit structure and/or the antenna structure.

5. The antenna module of claim 3, wherein a plurality of the antenna parts are provided on the second side of the circuit structure, a plurality of the corresponding antenna structures are straddled on a plurality of layers of the steps in the antenna supporting substrate respectively, and a number of layers of the plurality of antenna structures corresponds to the plurality of antenna parts, wherein all the antenna structures between the antenna layer of the antenna substrate of any one of the antenna structures and the antenna part of the circuit structure have an opening corresponding to the antenna part, so that there is no barrier but an air medium between the antenna layer of the antenna substrate of any one of the antenna structures and the corresponding antenna part.

6. A method of manufacturing an antenna supporting substrate, comprising:

providing a detachable carrier board with a metal surface;

forming a photoresist layer with a hollow cavity on the carrier board by patterned exposure and development, and forming a metal layer by electroplating in the hollow cavity of the photoresist layer;

repeating processes of the photoresist layer and the metal layer multiple times to form a plurality of other photoresist layers and a plurality of other metal layers stacked on the photoresist layer and the metal layer, wherein a width of each of the stacked metal layers decreases gradually from bottom to top in a stepped shape;

removing all the photoresist layers to expose the plurality of metal layers stacked in the stepped shape;

forming an insulating layer made of an insulating material on the carrier board to cover the plurality of metal layers stacked in the stepped shape, and removing part of the insulating material to expose an upper surface of the uppermost metal layer;

removing the carrier board to expose a lower surface of the lowermost metal layer; and removing all of the plurality of metal layers, so that the insulating layer is formed into the antenna supporting substrate having a step-shaped hollow cavity presenting a plurality of steps.

7. The method of claim 6, further comprising simultaneously forming a patterned concave hole around the hollow cavity when the hollow cavity of the photoresist layer of each layer is formed, and simultaneously forming an electrical conduction circuit in the concave hole when each of the metal layers is formed.

8. A method of manufacturing an antenna supporting substrate, comprising:

providing a detachable carrier board;

forming a photoresist layer on the carrier board by patterned exposure and development;

repeating processes of the photoresist layer multiple times to form a plurality of other photoresist layers stacked on the photoresist layer, wherein a width of each of the stacked photoresist layers decreases gradually from bottom to top in a stepped shape;

forming an insulating layer made of an insulating material on the carrier board to cover all the photoresist layers, and removing part of the insulating material to expose an upper surface of the uppermost photoresist layer;

removing the carrier board to expose a lower surface of the lowermost photoresist layer; and removing all of the photoresist layers, so that the insulating layer is formed into the antenna supporting substrate having a step-shaped hollow cavity presenting a plurality of steps.

9. The method of claim 8, further comprising forming a patterned electrical conduction circuit around any one of the photoresist layers after forming said any one of the photoresist layers.

10. A method of manufacturing an antenna supporting substrate, comprising:

providing a detachable carrier board;

forming a photosensitive insulating layer made of a photosensitive insulating material on the carrier board, and forming an opening area for defining a hollow cavity by patterning in an exposure manner;

repeating processes of the photosensitive insulating layer and the opening area multiple times to form a plurality of other stacked photosensitive insulating layers and define a corresponding plurality of opening areas, wherein a width of each of the stacked opening areas decreases gradually from bottom to top in a stepped shape;

removing the carrier board to expose a lower surface of the lowermost photosensitive insulating layer; and removing the photosensitive insulating material in each of the opening areas, so that the plurality of stacked photosensitive insulating layers are formed into the antenna supporting substrate having a step-shaped hollow cavity presenting a plurality of steps.

11. The method of claim 10, further comprising simultaneously defining a patterned concave hole around the opening area when the opening area of the hollow cavity of each of the photosensitive insulating layers is defined, and forming an electrical conduction circuit in the concave hole.

* * * * *